United States Patent
Han et al.

(10) Patent No.: US 7,985,358 B2
(45) Date of Patent: *Jul. 26, 2011

(54) PROCESS OF MAKING MOLD FOR OPTICAL FILM

(75) Inventors: Sang-Choll Han, Daejeon (KR); Jung-Min Ko, Daejeon (KR); Seung-Tae Oh, Daejeon (KR); Yune-Hyoun Kim, Daejeon (KR); Byung-Su Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/747,827

(22) PCT Filed: Mar. 3, 2009

(86) PCT No.: PCT/KR2009/001049
§ 371 (c)(1),
(2), (4) Date: Jun. 11, 2010

(87) PCT Pub. No.: WO2009/110737
PCT Pub. Date: Sep. 11, 2009

(65) Prior Publication Data
US 2010/0276844 A1  Nov. 4, 2010

(30) Foreign Application Priority Data

Mar. 3, 2008 (KR) .................. 10-2008-0019812
Mar. 3, 2009 (KR) .................. 10-2009-0018177

(51) Int. Cl.
*B29D 11/00* (2006.01)

(52) U.S. Cl. ........ 264/2.5; 264/1.37; 264/219; 264/400; 425/808

(58) Field of Classification Search ........... 264/1.1, 264/1.37, 2.5, 1.6, 2.7, 400, 482, 219; 425/808
See application file for complete search history.

(56) References Cited

FOREIGN PATENT DOCUMENTS

| JP | 2004-322566 A | 11/2004 |
|---|---|---|
| JP | 2005-324538 A | 11/2005 |
| JP | 2006-053371 A | 2/2006 |
| JP | 2006-168260 A | 6/2006 |
| JP | 2007-237541 A | 9/2007 |
| JP | 2007-298911 A | 11/2007 |

*Primary Examiner* — Mathieu D. Vargot
(74) *Attorney, Agent, or Firm* — McKenna, Long & Aldridge LLP

(57) ABSTRACT

There is provided a process of making a mold for optical films. The process of making a mold for optical films comprises: etching a stereostructure in a surface of the mold having a flat surface or an engraved convex and concave surface, by using a laser beam. The process of making a mold for optical films may be useful to easily mark spots, to control the height of protrusions and the position where the protrusions are formed, and also to form the protrusions having constant depths even in a curved surface such as a convex and concave surface.

8 Claims, 7 Drawing Sheets

[Fig. 12]
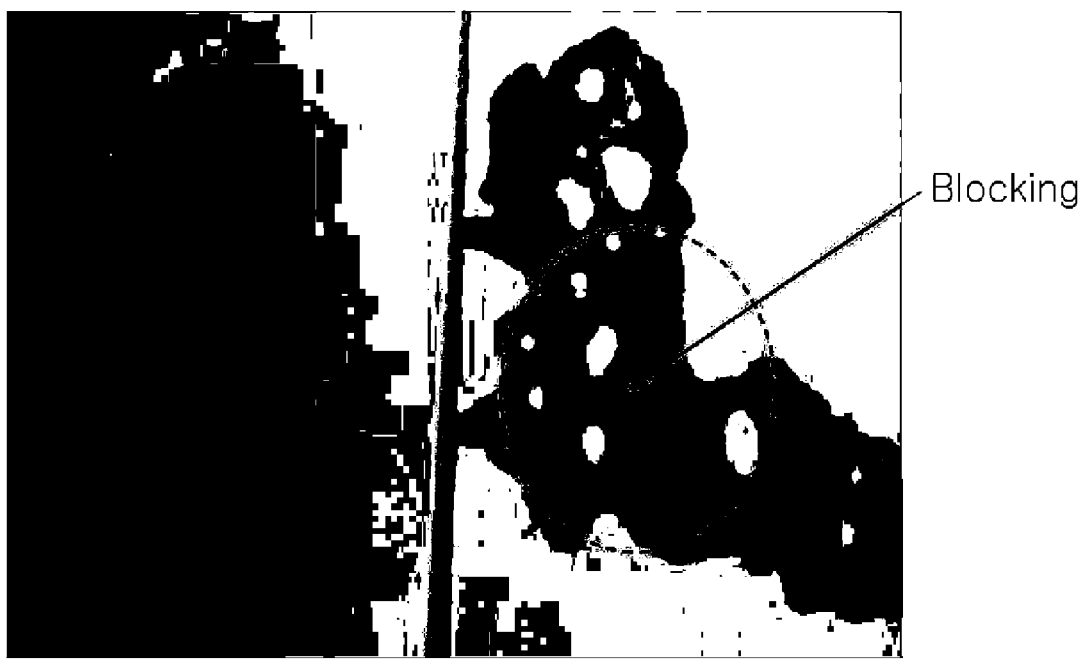

PROCESS OF MAKING MOLD FOR OPTICAL FILM

This application is a 35 U.S.C. §371 National Stage entry of International Application No. PCT/KR2009/001049, filed on Mar. 3, 2009, and claims priority to Korean Application No. 10-2008-0019812, filed on Mar. 3, 2008 and Korean Application No. 10-2009-0018177, filed on Mar. 3, 2009, which are all hereby incorporated by reference in their entireties.

TECHNICAL FIELD

The present invention relates to a process for making a mold for optical films, and more particularly, to a process for making a mold comprising: etching a stereostructure in a mold for optical films using a laser beam.

BACKGROUND ART

As one of the fields to which the present invention is applicable, a liquid crystal display (LCD) is a device that generally displays an image by injecting a liquid crystal material between an upper substrate and a lower substrate, changing orientations of liquid crystal molecules by forming an electric field between pixel electrodes and common electrodes, and adjusting the transmissivity of light according to the orientations of the liquid crystal molecules, wherein the upper substrate has common electrodes, color filters and the like formed therein, and the lower substrate has thin film transistors, pixel electrodes and the like formed therein.

Since this liquid crystal display panel is a passive element that does not voluntarily emit light, a backlight unit is necessarily installed in the liquid crystal display panel to supply light. In general, the backlight unit includes a light source supplying light; a diffuser plate or a light guide plate converting a line light source or a point light source into a surface light source; and a variety of optical films used to improve optical performances.

The optical films used in the backlight unit includes a collimating film used to improve brightness; a diffusing film having the effect of shielding optical defects in the rear of the backlight, or bright lines of the light source; a protective film used to protect the collimating film or the diffusing film from being scratched, etc.

Among them, the collimating film has lens structures arranged periodically to deflect a light path at one surface thereof. The lens structures used in the collimating film include a trigonal prism lens, a semicircular lenticular lens, micro lens, a Fresnel lens, etc.

These lens structures have functions to collimate light emitted from a light source towards the front of a display device to effectively improve brightness of the display device. However, the collimating films have problems regarding the Moire, wet-out and Newton ring phenomena, which are caused by the periodicity of the lens structures and air-gap, and also have a disadvantage in that surface defects occur on a screen due to the above-mentioned phenomena.

Also, an adhesion (blocking) phenomenon between optical films is caused while stacking a plurality of optical films with each other. However, the blocking phenomenon also causes surface defects to occur on a screen.

Therefore, in order to solve the above problems, there have been attempts to relieve the regularity of lens structures such as prism or lenticular lens. As one representative example, there has been proposed a method for relieving the regularity of a lens structure by throwing beads having a size of several micrometers to several tens micrometers to a surface of a mold having an engraved shape of a lens structure and sanding the lens structure. When the mold having an engraved shape of a lens structure is sanded with the beads, random secondary structures are further formed on the lens structure. As a result, the regularity of the lens structures is relieved to reduce the Moire phenomenon.

However, this method has problems in that it is difficult to expect a position where a secondary structure is formed due to the difficulty in controlling a position where beads are injected, and optical performances are deteriorated since beads are not injected to a concave surface of the mold due to the air turbulence, but sanded only on a convex surface of the mold. Also, the reliability of products is degraded since the reproducibility is not maintained at every sanding process. Furthermore, optical films prepared in these methods show somewhat improved Moire phenomenon, but have problems in that a collimating effect of the lens structures is deteriorated and the haze is increased due to the random formation of secondary structures. Also, this bead sanding process has its limits to suppress the wet-out phenomenon or the blocking between films.

DISCLOSURE OF INVENTION

Technical Problem

The present invention is designed to solve the problems of the prior art, and therefore it is an object of the present invention to provide a process of making a mold, which has excellent reproducibility and is able to control a position where a secondary structure is formed.

Also, it is another object of the present invention to provide an optical film having improved optical defects such as Moire, wet-out and Newton ring phenomena, and blocking between films.

Technical Solution

According to an aspect of the present invention, there is provided a process of making a mold for optical films, comprising: etching a stereostructure in a surface of the mold using a laser beam.

In this case, the mold may have a flat surface, or a convex and concave surface, and the stereostructure may be at least one selected from the group consisting of stereostructures having shapes of protrusions, shapes of convex lens, and a combination thereof.

Also, when the mold has a convex and concave surface and the stereostructure has the shapes of protrusions, the stereostructure may be formed on a concave portion of the convex and concave surface. Also, the shapes of protrusions may satisfy the requirements of the following Equations: $80 \times H^{1/3} \leq P \leq 200 \times H^{1/3}$ and $0.1D \leq H \leq D$, provided that a mean diameter of protrusions is represented by 'D', a mean height is represented by 'H', and a mean distance between adjacent protrusions is represented by 'P'.

In this case, the stereostructure having the shapes of protrusions may be etched while changing an initial phase of a laser beam along a transverse direction of the optical film.

Also, when the mold has a convex and concave surface and the stereostructure has the shapes of a convex lens, the stereostructure may be formed on a convex portion of the convex and concave surface of the mold.

Meanwhile, in the process of making a mold for optical films according to one exemplary embodiment of the present invention, the operation of etching a stereostructure in a surface of the mold using a laser beam may be carried out at least two times.

Also, the process may further comprises: forming the stereostructure having the shapes of a convex lens through bite processing or bead sanding prior to etching a stereostructure in a surface of the mold using a laser beam. In this case, the stereostructure may be engraved in a convex portion of the convex and concave surface.

Additionally, the mold may be a flat-type mold, a caterpillar-type mold or a drum-type mold, and may be made of at lest one selected from the group consisting of nickel, chromium and ceramics, or be made of at lest one selected from the group consisting of polymers and silica-coated polymers.

Furthermore, the convex and concave surface may be formed in the form of a lenticular lens, a prism, a micro lens array or a Fresnel lens.

Advantageous Effects

As described above, the process of making a mold for optical films according to one exemplary embodiment of the present invention may be useful to provide secondary shapes having a constant depth from a curved surface although any stereoscopic shapes are present in a mold, by using a laser process where a laser beam hardly reaches secondary shapes when it begin to etch the secondary shapes.

Also, the process of making a mold for optical films according to one exemplary embodiment of the present invention may be useful to mark spots relatively easily when compared to the conventional machine/bite cutting process since a shape, an area and a depth of etched metal per pulse are adjusted under the control of an optical system.

In addition, the laser etching has an advantage in that it is advantageous to suppress a Moire or wet-out phenomenon caused by the uniformity of protrusions since shapes per pulse are not uniform in a flat surface that is free from the prominence and depression, compared to the bite processing.

Furthermore, when the laser beam is Q-switching oscillation, it has an advantage in that one pattern processing per pulse is achieved since the laser beam has a high energy per pulse, and the spot processing time is short due to the high pulse frequency (10~100 kHz), compared to the bite processing.

BRIEF DESCRIPTION OF DRAWINGS

FIG. 12 is a photograph illustrating the comparison of the blocking prevention effects between the optical film according to Example 3 and Comparative example 2.

BEST MODE FOR CARRYING OUT THE INVENTION

Hereinafter, exemplary embodiments of the present invention will be described in more detail.

The present inventors have made ardent attempts, and fount that the surface defects caused by the Moire, Newton ring and wet-out phenomena and the blocking between films may be significantly reduced without degrading the brightness of the optical film by forming stereostructures, whose height and distribution (distance) are controlled, on a surface of an optical film.

More particularly, the present inventors have found that the optical film comprising a light-incident portion and a light exit portion may be useful to suppress the blocking between films, which is caused when a plurality of films are stacked with each other, and to improve the optical performance of an optical film by forming a plurality of stereostructures ('Protrusions') on one surface out of the light-incident portion and light exit portion, wherein the stereostructures acts as a spacer.

According to the studies of the present inventors, the protrusions are preferably formed so that the stereostructure satisfies the requirements of the following Equation 1: $80 \times H^{1/3} \leq P \leq 200 \times H^{1/3}$ and $0.1 \times D \leq H \leq D$, provided that a mean diameter of protrusions is represented by 'D', a mean height is represented by 'H', and a mean distance between adjacent protrusions is represented by 'P'. More preferably, the protrusions are formed around peak of a lens structure. The unit of P, D and H is micrometer.

Also, the present inventors have found that the optical performance of the optical film may be improved by further forming a lens-shaped stereostructures ('convex portions') in a surface of the optical film in addition to the protrusions, and the Moire performance is significantly improved when the convex portions are particularly formed in a valley region of a lens structure.

Figure 1:
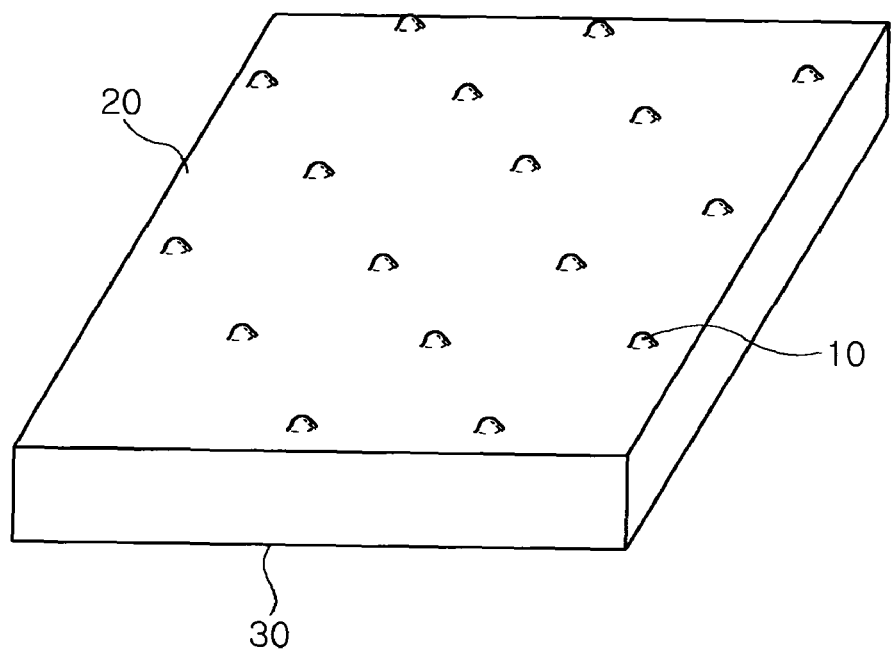
FIGS. 1 to 3 are diagrams illustrating optical films prepared in a mold according to one exemplary embodiment of the present invention.
Figure 3:
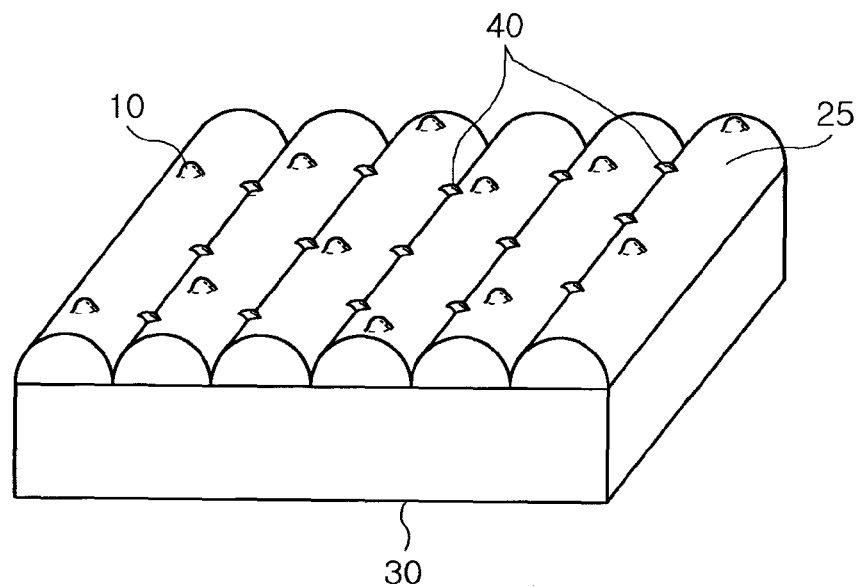

FIGS. 1 and 3 show optical films according to one exemplary embodiment of the present invention.

As shown in FIG. 1, the optical film according to one exemplary embodiment of the present invention includes a light-incident portion 30 and a light exit portion 20. Here, both of the light-incident portion 30 and the light exit portion 20 may have a flat surface, and a plurality of protrusions 10 is formed in at least one surface out of the light-incident portion 30 and the light exit portion 20. In this case, a plurality of the protrusions 10 are formed so that the protrusions 10 can satisfy the requirements of the Equations 1 and 2.

When both of the light-incident portion 30 and the light exit portion 20 are flat, the surface defects, which are caused by the Moire, Newton ring and wet-out phenomena caused by the lens structure, do not occur, but the surface defects caused by the blocking between optical films occur. When the protrusions are formed on the light-incident portion and/or the light exit portion according to the present invention, the protrusions act as a spacer between optical films, thereby preventing the blocking between films. However, when the protrusions are formed too compactly, hazes are getting serious, and a brightness of the optical film is degraded by the light-spreading effect observed in the protrusions. Also, when the distance between the protrusions is too wide, the blocking between films is poorly suppressed. Therefore, in accordance with the present invention, it is possible to effectively prevent the blocking between films and suppress the loss in brightness and the increases in haze by controlling the height and distance of the protrusions to the ranges of the Equations 1 and 2.

Figure 2:
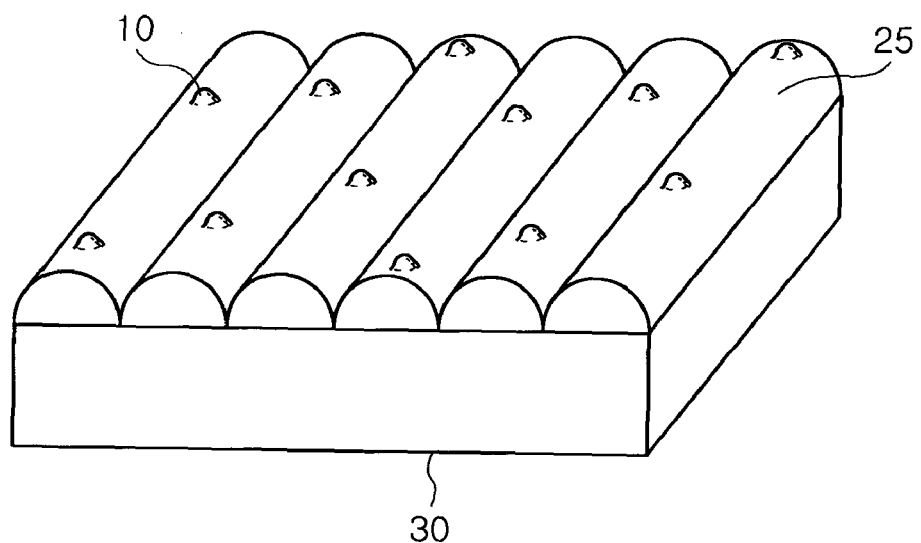

Meanwhile, the optical film according to one exemplary embodiment of the present invention may include a light exit portion 20 composed of a lens structure 25; and a flat light-incident portion 30, as shown in FIG. 2. In this case, a plurality of protrusions 10 is formed on the lens structure 25. In particular, a plurality of the protrusions 10 are preferably formed around the peak of the lens structure 20. Also, although not shown in the drawings, a plurality of protrusions 10 may also be formed on the light-incident portion 30 of the optical film.

FIG. 2 shows that protrusions 10 are formed on respective lens structures 25, but the distribution of the protrusions may be varied according to the height of the formed protrusions and the desired optical performance of the optical film. Here, the protrusions should be formed so that they can satisfy the requirements of the Equations 1 and 2, but it is not necessary to form protrusions on all the lens structures.

In accordance with the present invention, when the protrusions 10 are formed on the peak region of the lens structure 25 and/or the light-incident portion 30, the protrusions act as a spacer, and have the effect of preventing the blocking between films and preventing the surface defects caused by the wet-out or Newton ring phenomenon.

FIG. 2 shows that the lens structure 20 comprises a lenticular lens, but the present invention is not particularly limited thereto. Therefore, it is considered that the lens structure 20 comprises a variety of lens structures that are used in the art to collimate light, for example a prism, a lenticular lens, a micro lens array, a Fresnel lens, etc.

As shown in FIG. 3, the optical film according to one exemplary embodiment of the present invention may further comprise convex portions 40 in addition to the protrusions 10 formed on the lens structure 25. The convex portions 40 are preferably formed on the valley region of the lens structure. When the convex portions 40 are formed on the valley region of the lens structure 25, the convex portions 40 have the effect of preventing the Moire phenomenon by reducing the transmission of light between the peak region and the valley region of the lens structure.

The optical film according to the present invention will be described in more detail in another application (Title: optical film and manufacturing process thereof) filed by the same applicant.

However, it is impossible to control the distance and height of the protrusions using the conventional method such as bead sanding. Therefore, a new method is required to manufacture this film.

In order to solve the problems of the prior art, the present invention is characterized in that the process of making a mold for optical films according to one exemplary embodiment of the present invention includes: etching a stereostructure using a laser beam.

Hereinafter, the process of making a mold according to one exemplary embodiment of the present invention will be described in more detail.

The process of making a mold according to one exemplary embodiment of the present invention includes: etching a stereostructure in a surface of a mold using a laser beam.

Figure 4:
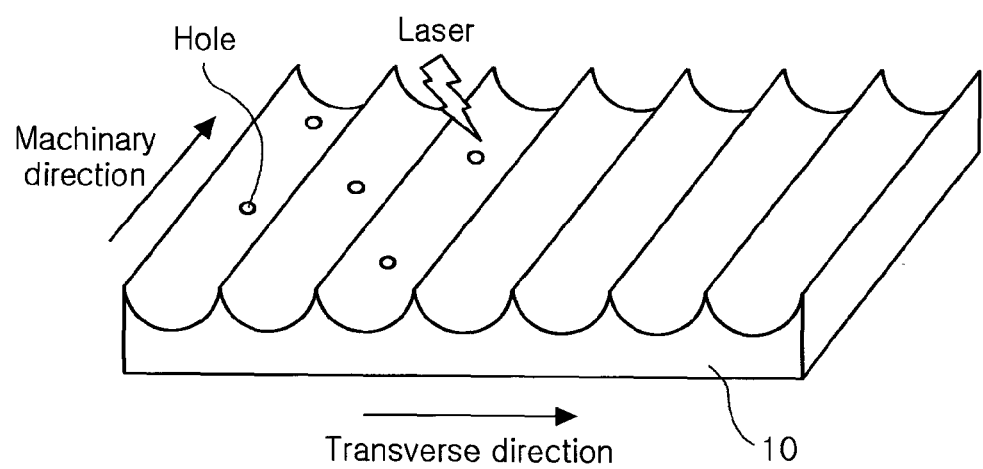
FIG. 4 is a diagram illustrating a process of making a mold according to one exemplary embodiment of the present invention.

In this case, the mold may have a convex and concave surface having an engraved shape of a lens structure, or a flat surface, as shown in FIG. 4. When a mold, which is used to manufacture a surface of an optical film having a lens structure formed therein as in an upper surface of a collimating film, is prepared, a mold having an engraved shape of the lens structure may be used. Also, when a mold, which is used to manufacture an optical film whose surface does not have any shape as in surface of a diffusing film or in a lower surface of a collimating film, is prepared, a mold having a flat surface may be used.

Also, when the mold has a convex and concave surface, the convex and concave surface may be formed in the form of a lens structure such as a micro lens array, a lenticular lens, a Fresnel lens and a prism, but the present invention is not particularly limited thereto.

Figure 5:
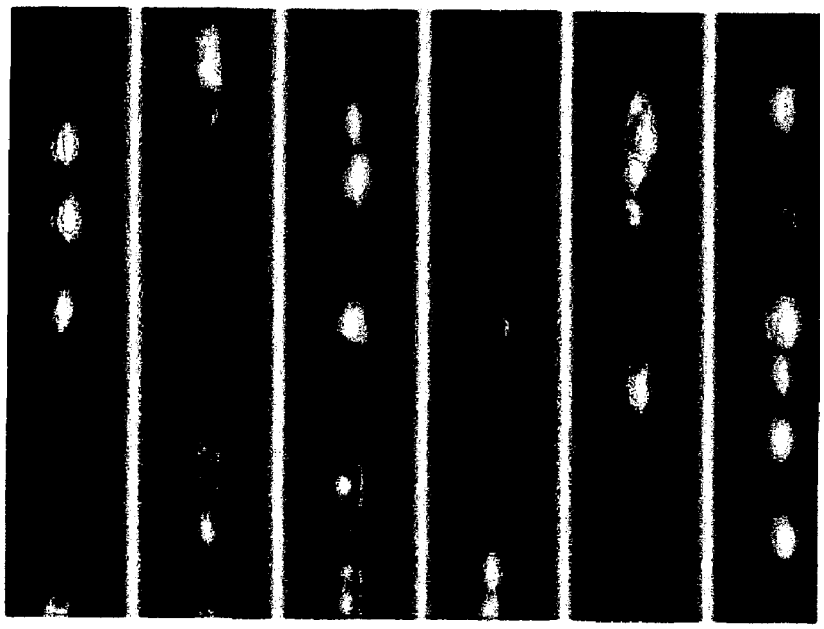
FIG. 5 is a photograph illustrating an optical film prepared in a mold which is made using a conventional bead sanding process.

In addition, the present invention is characterized in that a laser beam is used to etch a stereostructure in a surface of the mold. In accordance with the present invention, the reasons for the use of laser beam is why it is possible to perfectly control the position and height of the etched stereostructure since a shape, an area and a depth of etching per pulse may be adjusted under the control of an optical system. The bead sanding process, which was widely used in the art, has a problem in that it is impossible to control the position or height of the stereostructure. FIG. 5 shows an optical film prepared in a mold which is made using a conventional bead sanding process. As shown in FIG. 5, it is revealed that the protrusions (stereostructures) are formed with random sizes, and distributed in a random manner. When the protrusions having such irregular shapes and distribution are formed on the optical film, it is impossible to control the optical performance of the optical film.

Figure 6:
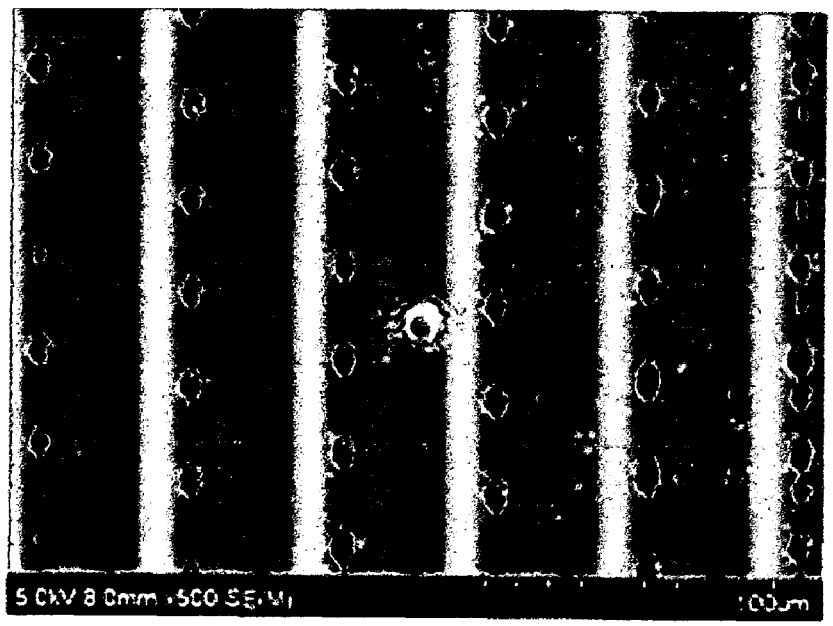
FIG. 6 is a photograph illustrating an optical film prepared in a mold which is made using the process according to one exemplary embodiment of the present invention.

Meanwhile, FIG. 6 shows a photograph taken from an optical film prepared using a laser beam. As shown in FIG. 6, when a laser beam is used to engrave the stereostructure, it is possible to perfectly control the position and height of the stereostructure. Therefore, the laser etching has advantages in that it is possible to manufacture an optical film having more excellent optical performance, and the reproducibility of the optical film is excellent.

Also, the bead sanding process has a disadvantage in that a stereoscopic shape that is formed on a mold in advance, that is, a lens structure, is damaged by throwing beads, but the laser etching has an advantage in that the stereoscopic shape is hardly damaged.

Also, although any stereoscopic shapes are present in a mold, secondary shapes having a constant depth from a curved surface may be provided with an etching surface since the laser beam hardly reaches the etching surface when it begin to process the etching surface.

Also, when a flat surface without any concave and convex is subject to the laser etching, shapes per pulse are not as much uniform as in the bite processing. Therefore, it is rather advantageous to suppress a Moire or wet-out phenomenon caused by the uniformity.

Also, the conditions of the laser etching according to the present invention are determined according to the height, diameter and distance of etched stereostructures, and the materials of a mold, etc. That is, it is possible to control the height, diameter and distance of the etched stereostructure by controlling the conditions of the laser etching. When necessary, it is possible to form the etched stereostructure in a regular or irregular manner.

For example, a protrusion structure having a width of 15 μm and a height of 5 μm may be formed by irradiating a laser beam with a laser pulse energy of approximately $1.2 \times 10^7$ J/cm². However, the conditions of the laser etching are merely one example of the present invention, but the present invention is not particularly limited thereto. Since the laser etching has been widely known in the art, it is possible to form protrusions having desired shapes using the conventional technology and a disclosure of the present invention, as apparent to those skilled in the art.

Also, in accordance with the present invention, the etched stereostructure may have a protrusion shape or a convex lens shape, and may all comprise a stereostructure having a protrusion shape and a stereostructure having a convex lens shape, as shown in FIG. 3.

In addition, when the mold has a convex and concave surface and the stereostructure has a protrusion shape, the stereostructure having the protrusion shape is preferably formed on a concave portion (corresponding a peak of a lens structure in the optical film) of the convex and concave surface. When the mold having engraved protrusions formed in a concave portion of the convex and concave surface is used to manufacture an optical film, the prepared optical film has protrusions formed in a peak region of the lens structure. When the protrusions are formed on a peak region of the lens structure, the protrusions act as a spacer, and have the effect of preventing the blocking between films and the surface defects caused by the wet-out or Newton ring phenomenon.

In this case, the stereostructure of the protrusion shape is preferably formed so that the stereostructure can satisfy the requirements of Equations: $80 \times H^{1/3} \leq P \leq 200 \times H^{1/3}$ and $0.1D \leq H \leq D$, but the present invention is not particularly limited to. In this case, a mean diameter of protrusions is represented by 'D', a mean height is represented by 'H', and a mean distance between adjacent protrusions is represented by 'P'. When the protrusions are formed so that the protrusions can satisfy the requirements of the ranges as described above, it is possible to effectively suppress the Moire, wet-out and Newton ring phenomena, and the blocking between films, without any loss in brightness of the optical film.

In this case, when the stereostructure of the protrusion shape is also etched, it is preferred to change an initial phase of a laser beam along a transverse direction of an optical film. When the initial phase of a laser beam is changed along the transverse direction of an optical film during the laser etching, an etching surface is endowed with the irregularity while the position of the formed protrusions is slightly changed along the transverse direction of an optical film. Therefore, it is more effective to suppress the Moire phenomenon caused by the regularity of the protrusions. In this case, the brightness of the optical film is hardly reduced since the protrusions are not completely randomly formed as in the bead sanding process.

Also, when the mold is a convex and concave surface and the stereostructure has a convex lens shape, the stereostructure having a convex lens shape is preferably formed in a convex portion of the convex and concave surface. When the stereostructure of the convex lens shape is engraved in the convex portion of the mold, it is possible to manufacture an optical film using the mold. When the mold is used to manufacture an optical film, the stereostructure of the convex lens shape is formed in the valley region of the lens structure of the optical film. In this case, it is possible to improve the Moire performance more effectively. One of major factors that cause a Moire phenomenon is the difference in transmission between a peak region and a valley region of the lens structure. In general, since the valley region of the lens structure is formed in the form of a cusp, the light incident towards the valley region has a higher reflection than the transmission of the incident light. As a result, the valley region of the lens structure has a relatively lower brightness than the peak region of the incident light, which leads to the irregular striped stains caused by the Moire phenomenon. However, when lens-shaped convex portions are formed on the valley region of the lens structure according to the present invention, the transmission in the valley region is improved, thereby improving the Moire performance more effectively.

However, since the stereostructure of the convex lens shape has a relatively higher size than the stereostructure of the protrusion shape, the stereostructure may be processed through bead sanding or bite processing, but not processed through the laser etching. When the bead sanding or bite processing is used to process the stereostructure of the convex lens shape, the bead sanding or bite processing is preferably carried out prior to the laser etching.

Also, when the stereostructure of the convex lens shape is processed through the bead sanding, it is difficult to control the position of the formed stereostructure of the convex lens shape as in the laser etching. However, the bead sanding has the same effect as the laser etching since beads are mainly sanded on a convex region (i.e. a valley region of the lens structure in the optical film) of a mold rather than a concave region (i.e. a peak region of the lens structure in the optical film) of the mold due to the air turbulence formed during the bead sanding.

In addition, the laser etching may be carried out several times in the manufacture of the mold according to one exemplary embodiment of the present invention. A stereostructure having a protrusion shape and a stereostructure having a convex lens shape may be sequentially processed by carrying out the laser process several times as described above. Therefore, it is possible to manufacture a mold for optical films, wherein the mold has at least two stereostructure having different shapes. For example, a stereostructure of a convex lens shape is etched on a mold having an engraved lenticular lens shape using a laser beam, and a stereostructure of a protrusion shape is etched using a laser beam to prepare a mold having a lenticular lens layer, a stereostructure of a convex lens shape and a stereostructure of a protrusion shape, all of which are formed in the mold.

Furthermore, the kinds and materials of the mold used in the present invention may be used without particular limitation. For example, the mold may be a flat-type mold, a caterpillar-type mold or a drum-type mold, and the mold may be made of nickel, chromium or ceramics, or be made of polymers or silica-coated polymers. Due to the characteristics of the laser etching, however, the mold is more preferably made of a hard material such as nickel, chromium or ceramics rather than the soft materials. The soft materials may be easily deformed during the laser etching.

MODE FOR THE INVENTION

Hereinafter, exemplary embodiments of the present invention are described in more detail.

The following Examples 1 and 2 and Comparative example 1 were conducted by stacking two lenticular lens sheets, which have been recently proven to be the most effectively used in televisions or other monitors, above and below. In this case, a elongation direction of lenticular lens of the upper sheet is perpendicular to that of lenticular lens of the lower sheet.

Example 1

A surface of a mold having an engraved lenticular lens structure (pitch: 50 μm and height: 23 μm) was irradiated with a laser beam (pulse energy: ~1.2×0⁷ J/cm²) to etch protrusions having a diameter of 15 μm and a height of 5 μm with a distance of 300 μm, thus to prepare a mole for optical films.

An upper surface of a UV curable resin extruded into a film was pressed in the mold for optical films to prepare an optical film having a flat surface formed in a lower surface therein, a lenticular lens structure formed in an upper surface therein, and protrusions (diameter: 15 μm, height: 5 μm and distance: 300 μm) formed in a peak region of the lenticular lens structure.

The two optical films thus prepared were stacked above and below, put on a backlight diffuser plate, and the brightness of the lenticular lens sheets was measured using a brightness/optical distribution measurement machine (ELDIM). Then, the two optical films were re-measured and corrected using BM7 so as to measure the brightness of an optical film more exactly.

Example 2

A mold having an engraved lenticular lens structure (pitch: 50 μm and height: 23 μm) was used to prepare an optical film having a lenticular lens structure (pitch: 50 μm and height: 23 μm) formed in an upper surface thereof but no protrusion.

The optical film prepared in Example 1, that is, an optical film having protrusions formed in a lens structure thereof was stacked on the optical film (i.e. an optical film having no protrusion) thus prepared. Then, the optical film was measured for brightness in the same manner as in Example 1.

Comparative Example 1

Two optical film having a lenticular lens structure (pitch: 50 μm and height: 23 μm) formed therein but no protrusion were stacked on an upper surface of an optical film. Then, the optical films were measured for brightness in the same manner as in Example 1.

Figure 7:
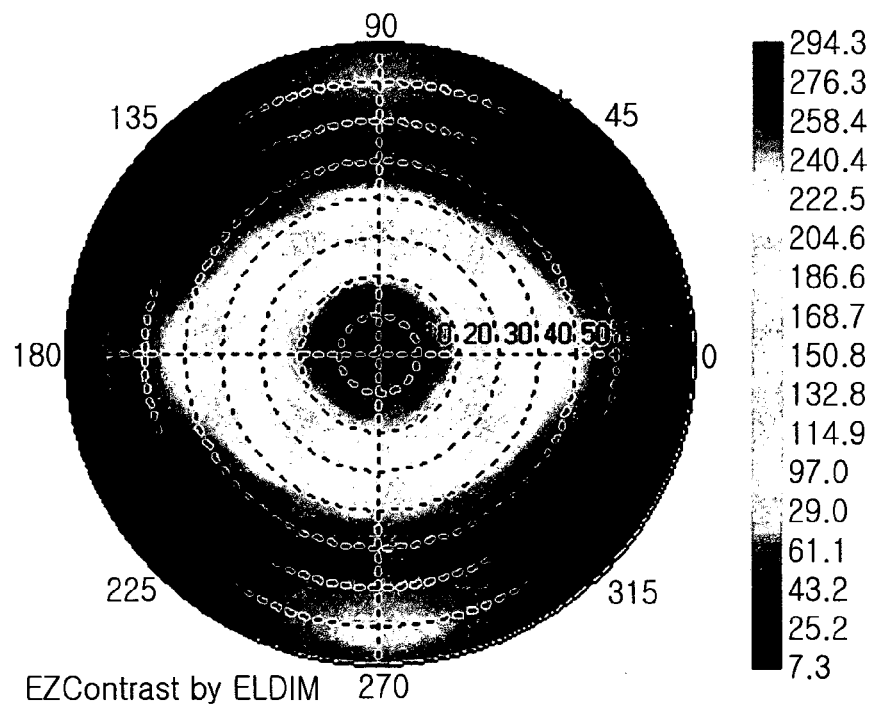
FIG. 7 is a diagram illustrating the brightness of an optical film described in Example 1.
Figure 8:
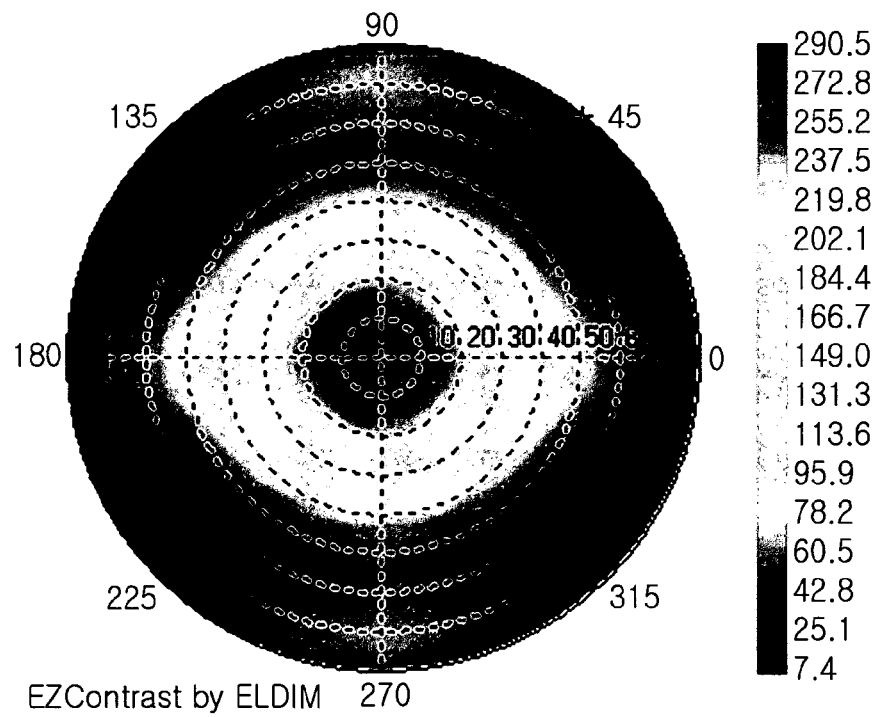
FIG. 8 is a diagram illustrating the brightness of an optical film of Example 2.
Figure 9:
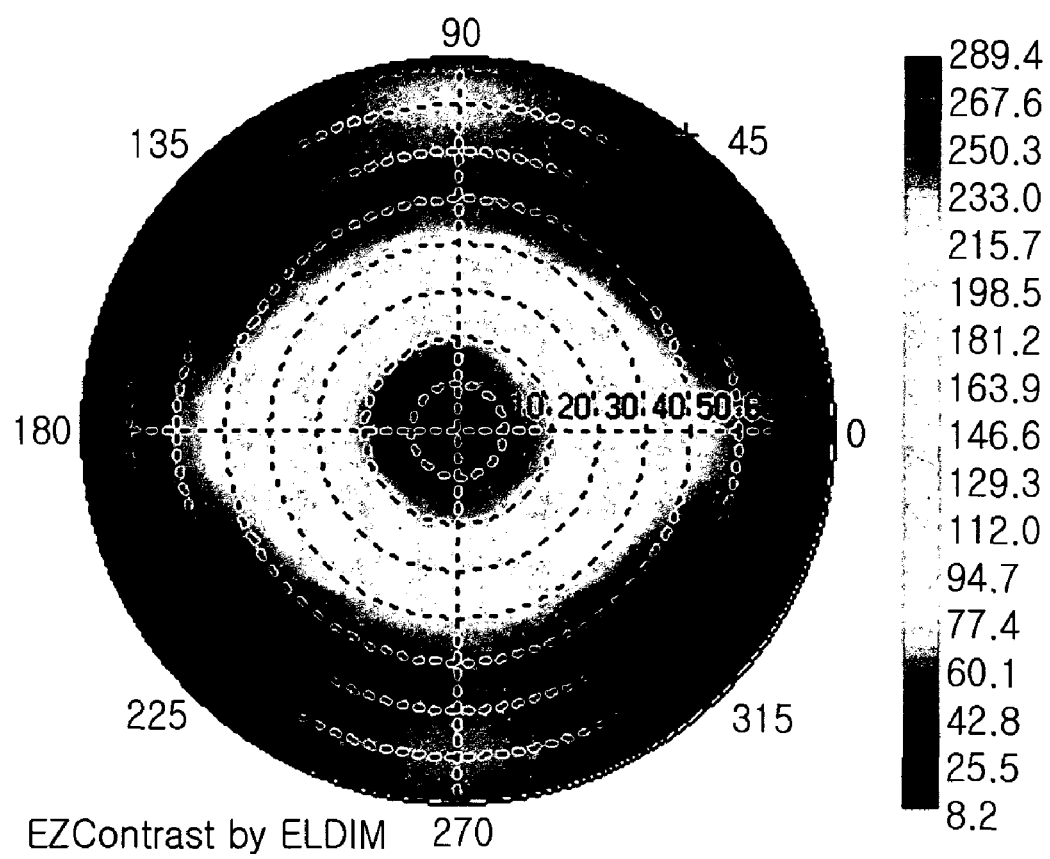
FIG. 9 is a diagram illustrating the brightness of an optical film of Comparative example 1.

The measurement results of the optical film of Example 1 are shown in FIG. 7, the measurement results of the optical film of Example 2 are shown in FIG. 8, and the measurement results of the optical film of Comparative example 1 are shown in FIG. 9.

Figure 10:
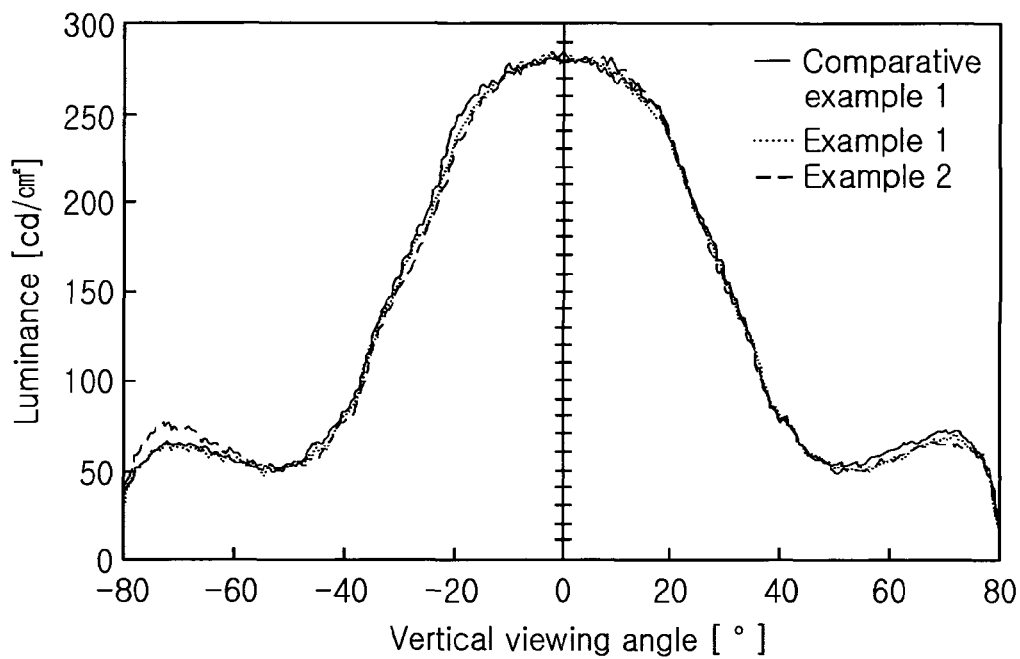
FIG. 10 is a graph illustrating the changes in brightness according to the vertical viewing angles of the optical films described in Examples 1 and 2 and Comparative example 1.
Figure 11:
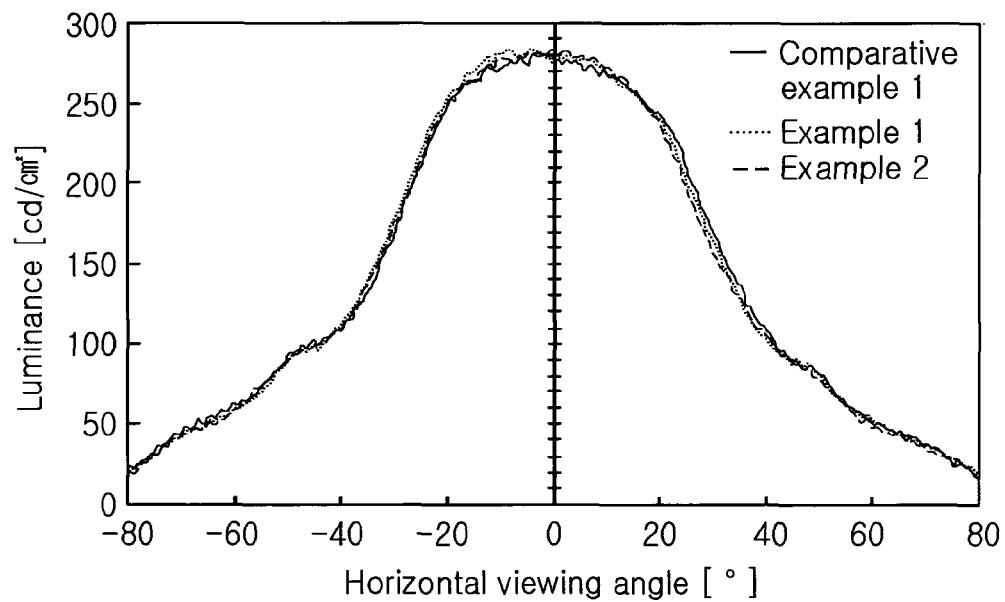
FIG. 11 is a graph illustrating the changes in brightness according to the horizontal viewing angles of the optical films described in Examples 1 and 2 and Comparative example 1.

Also, the brightness values according to the vertical/horizontal viewing angles of the optical films of Examples 1 and 2 and Comparative example 1 are shown in FIGS. 10 and 11, respectively.

As shown in FIGS. 7 to 11, it was revealed that the optical films of Examples 1 and 2 has the substantially same brightness value as the optical film of Comparative example 1 in which protrusions are not formed, which indicates that the loss in brightness is not caused by the protrusions.

Example 3

A PET film was stacked on the optical film (i.e. an optical film having protrusions formed in a lens structure thereof) prepared in the method of Example 1, and the resulting film-laminate was kept at 80° C. for 48 hours under relative moisture of 95%, and then measured for the blocking between films, a wet-out phenomenon, a Newton ring phenomenon, and the presence of scratches.

Comparative Example 2

In comparison, a PET film was stacked on a brightness enhancement film (BEF, 3M) that has been most widely used in the art, and the resulting film-laminate was kept at 80° C. for 48 hours under relative moisture of 95%, and then measured for the blocking between films, a wet-out phenomenon, a Newton ring phenomenon, and the presence of scratches.

The optical defects such as the Newton ring and wet-out phenomena and the blocking between films were observed with the naked eye in a distance of approximately 30 cm through the reflected light with illumination of 150 lumens (working environments in offices or laboratories).

Meanwhile, the presence of scratches was measured using a pencil hardness tester, and observed with the naked eye after the 2H test.

The measurement results are listed in the following Table 1, and FIG. 12 is a photograph illustrating the blocking between both of the film-laminates. Here, FIG. 13 C shows film-laminate of Example 3 and FIG. 13 D shows film-laminate of Comparative example 2.

TABLE 1

| TEST ITEM | Example 3 | Comparative example 2 |
| --- | --- | --- |
| Newton ring | None | Detected |
| Wet-out | None | Detected |
| Blocking between films | None | Detected |
| Scratches (2H test) | None (Level 5H) | Detected (Level 1H) |

As listed in Table 1 and shown in FIG. 13, it was revealed that the optical film according to one exemplary embodiment of the present invention has the effect of preventing the blocking between films, compared to the conventional films, and also has the excellent effect of suppressing the formation of optical defects such as Moire, wet-out and Newton ring phenomena.

The invention claimed is:

1. A process of making a mold for optical films, comprising:
   preparing a mold having a convex and concave surface, and etching protrusions in a concave portion of the convex and concave surface by using a laser beam,
   wherein the protrusions satisfy the requirements of the following equations: $80 \times H^{1/3} \leq P \leq 200 \times H^{1/3}$ and $0.1 \times D \leq H \leq D$, provided that a mean diameter of the protrusions is represented by 'D,' a mean height thereof is represented by 'H,' and a mean distance between adjacent protrusions is represented by 'P'.

2. The process of claim 1, wherein the laser beam has an initial phase chanced along a transverse direction of the mold.

3. The process of claim 1 further comprises; etching stereostructures having a shape of a convex lens in a convex portion of the convex and concave surface by using the laser beam.

4. The process of claim 1, further comprising: engraving stereostructures having a shape of a convex lens through bite processing or bead sanding on a convex portion of the convex and concave surface, prior to etching protrusion in the concave portion of the convex and concave surface.

5. The process of claim 1, wherein the mold is a flat mold, a caterpillar mold or a drum mold.

6. The process of claim 1, wherein the mold is made of at least one material selected from the group consisting of nickel, chromium and ceramics.

7. The process of claim 1, wherein the mold is made of at least one material selected from the group consisting of polymers and silica-coated polymers.

8. The process of claim 1, wherein the convex and concave surface is formed in the form of a lenticular lens, a prism, a micro lens array or a Fresnel lens.

* * * * *